Figure 1:
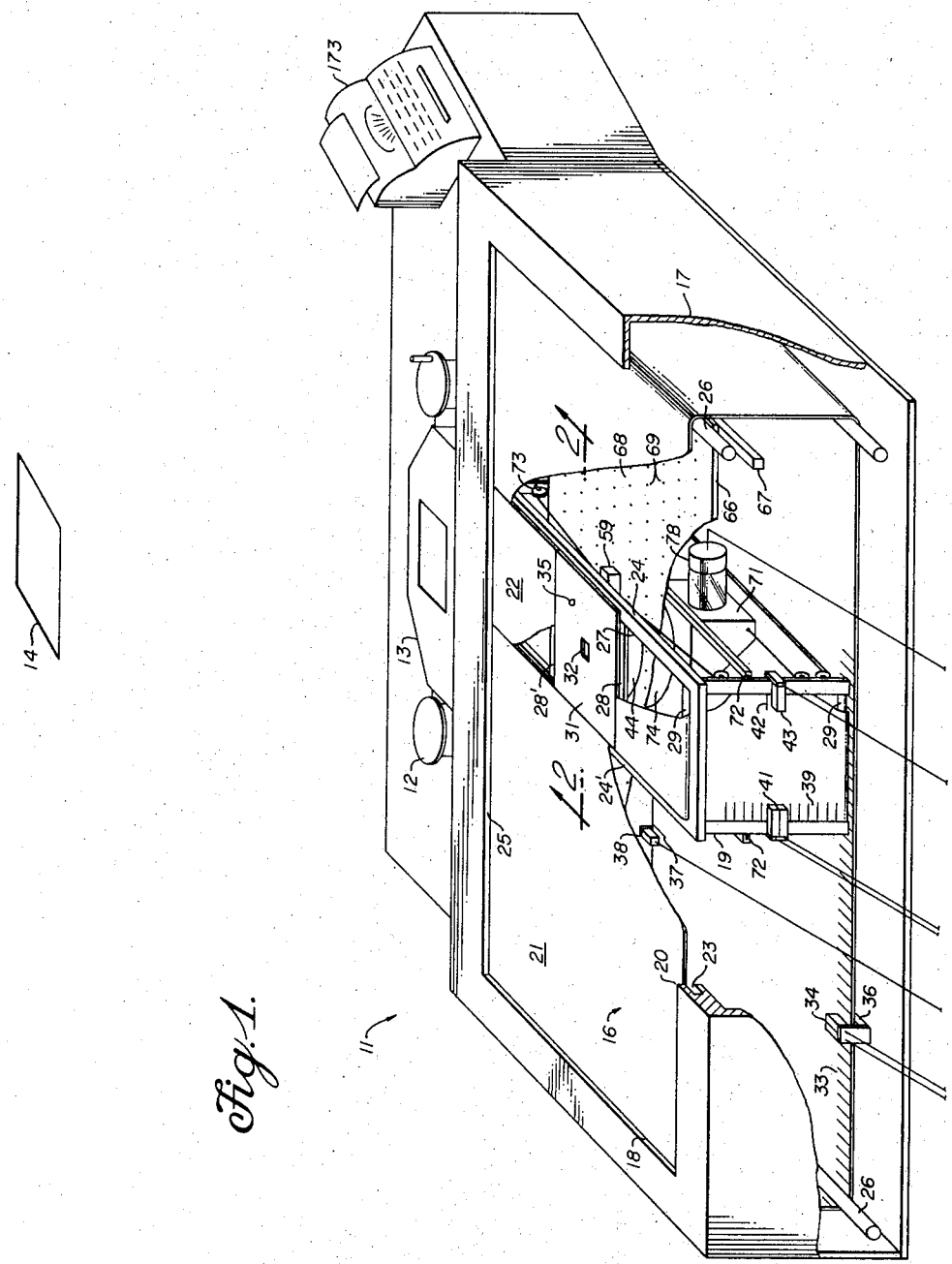

Jan. 30, 1968 L. W. ALVAREZ 3,366,794
SCANNING APPARATUS FOR AIDING IN THE DETERMINATION OF POINT
CO-ORDINATES OF PATHS OF CHARGED PARTICLES AS RECORDED
ON PHOTOGRAPHIC FILM

Filed June 26, 1963 4 Sheets-Sheet 1

INVENTOR.
LUIS W. ALVAREZ
BY
*Roland A. Anderson*

ATTORNEY.

Jan. 30, 1968     L. W. ALVAREZ     3,366,794
SCANNING APPARATUS FOR AIDING IN THE DETERMINATION OF POINT
CO-ORDINATES OF PATHS OF CHARGED PARTICLES AS RECORDED
ON PHOTOGRAPHIC FILM
Filed June 26, 1963     4 Sheets-Sheet 2

INVENTOR.
LUIS W. ALVAREZ
BY
Roland A. Anderson
ATTORNEY.

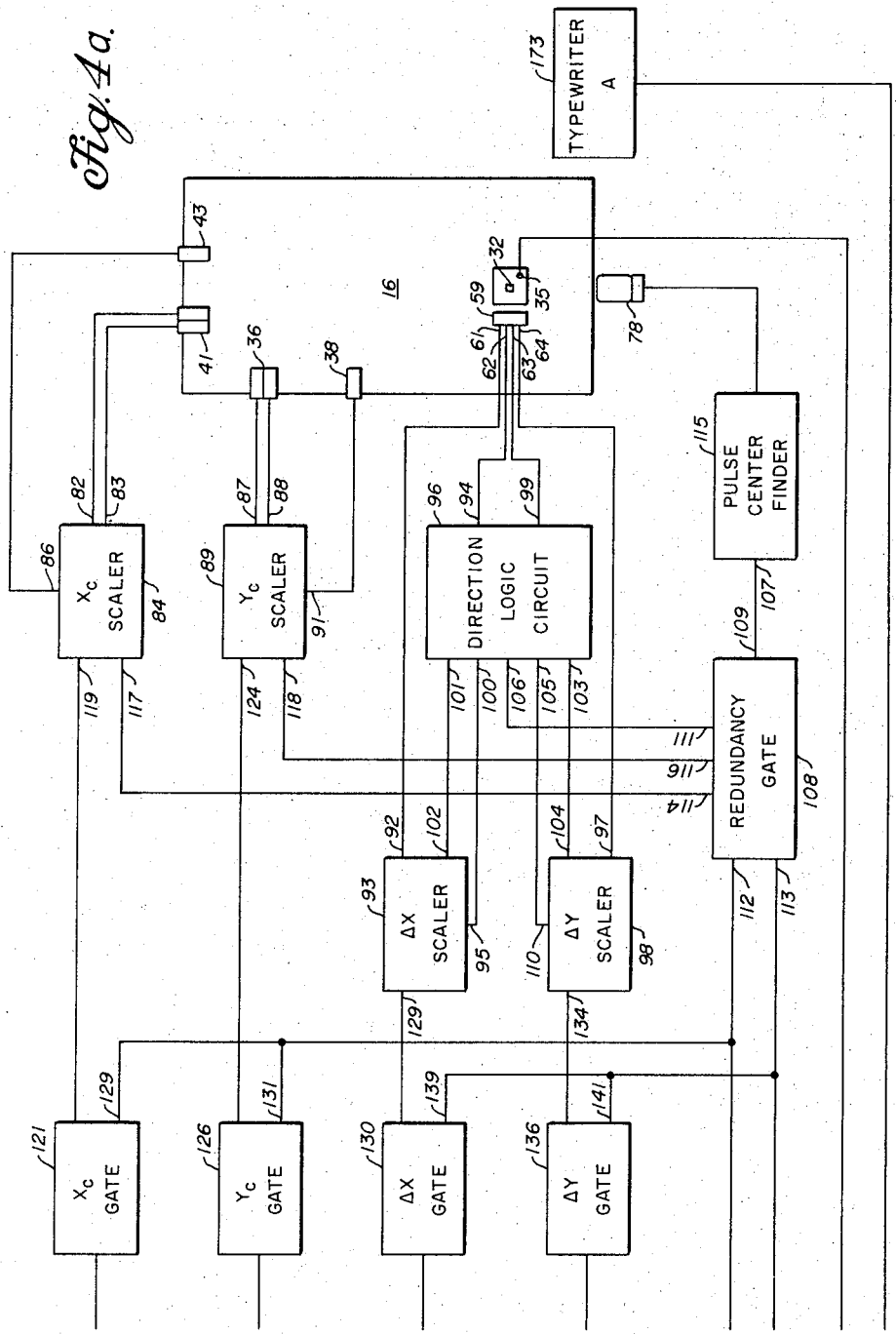

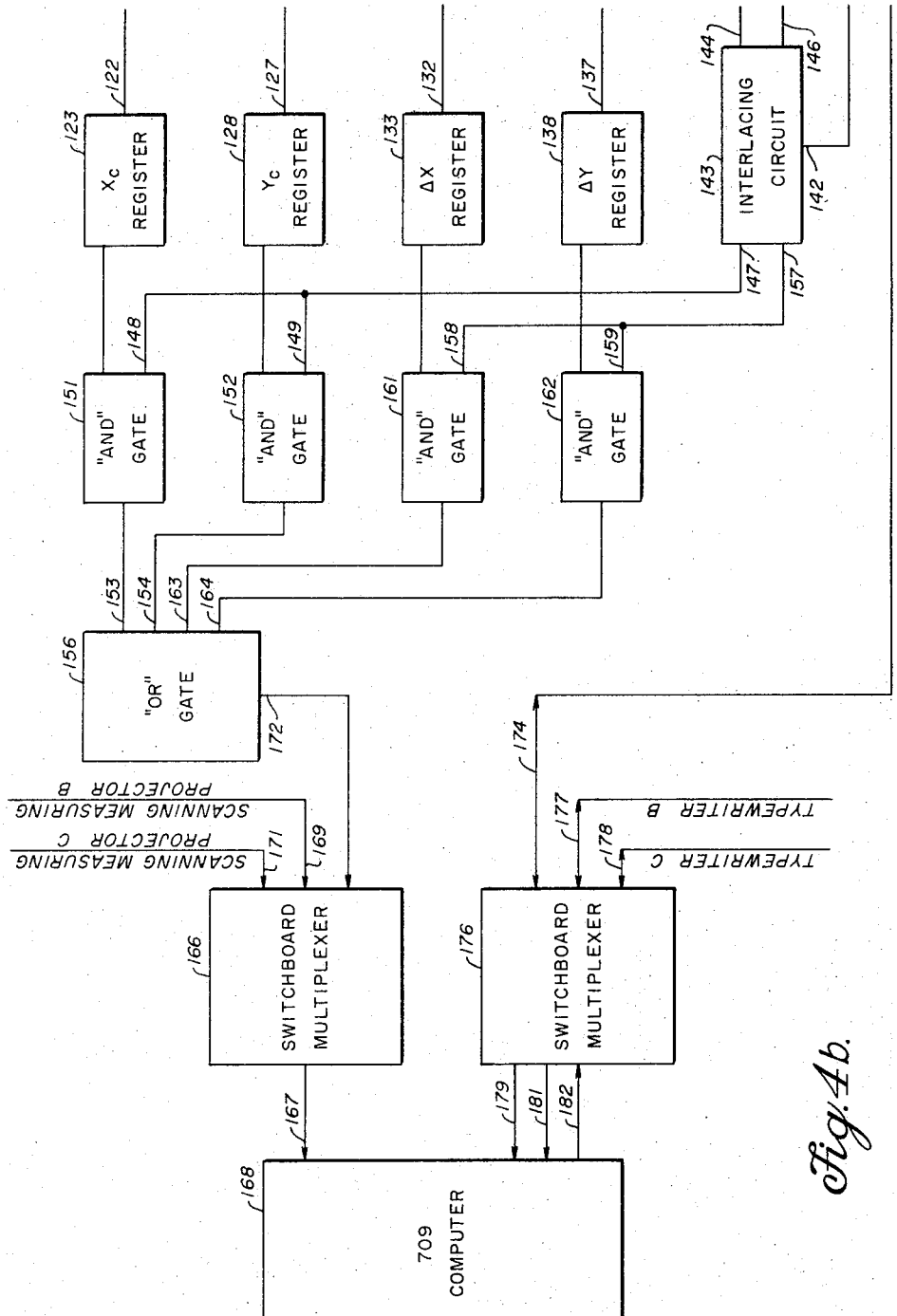

United States Patent Office 3,366,794
Patented Jan. 30, 1968

3,366,794
SCANNING APPARATUS FOR AIDING IN THE DETERMINATION OF POINT CO-ORDINATES OF PATHS OF CHARGED PARTICLES AS RECORDED ON PHOTOGRAPHIC FILM
Luis W. Alvarez, Berkeley, Calif., assignor to the United States of America as represented by the United States Atomic Energy Commission
Filed June 26, 1963, Ser. No. 290,869
11 Claims. (Cl. 250—219)

The present invention relates to apparatus for the precise and rapid measurement of point co-ordinates along a line or curve and is of the class particularly adapted for measuring the paths of charged particles in a bubble chamber, cloud chamber, or the like, as recorded on photographic film. More particularly the invention is a semi-automatic film scanning and track measuring device which uses a unique and highly advantageous measuring technique and which is designed to operate on-line with a computer to provide immediate analysis of the measurement data. The invention described herein was made in the course of, or under, Contract W–7405–eng–48 with the United States Atomic Energy Commission.

Upon the advent of the bubble chamber as a charged particle detector for use in nuclear physics experiments, the production of photographed data on particle interactions and decays soon exceeded the capacity of existing data analysis techniques. This analysis essentially includes a review of the stereoscopic sets of films taken at the bubble chamber windows to find particle track patterns thereon of interest to the experimenter. The tracks involved in the selected events must then be measured whereby from the information of the curvature, direction, and angles of intersection of the particle traces, appropriate computations will reveal the pertinent properties of the particles involved, e.g., the particle mass, velocity, etc.

Since the processing of such vast quantities of film by scanning technicians using manual measuring techniques is not practical, various semi-automatic scanning systems have been devised to handle the rapidly accumulated data.

Such systems have required a degree of human monitoring to effect pattern recognition but have employed a variety of track tracing and measuring mechanisms whereby the tedious and time-consuming co-ordinate plotting and recording of the selected tracks is done automatically. By using these mechanisms, the film processing rate per operator-hour is increased by orders of magnitude. One form of such a measuring system is taught in U.S. Patent No. 2,895,053 issued July 14, 1959 to J. V. Franck et al. for Measuring Projector.

In general these rapid measurement machines respond to an average center of an increment of the particle track being traced and directly relate the co-ordinate position of this increment center to a major co-ordinate origin or reference datum, usually fiducial marks on the film. The co-ordinate distances between the measured point and the origin reference are established from the travel of very high precision worm gears or lead screws or the translation in ways along the orthogonal directions of the scanning stage. Some systems, such as that of the patent identified above, further employ self-positioning mechanisms using the differential light response about the track increment to drive servo-motors which center the measuring point on the track.

The track measurements are made to an accuracy of from 2 to 4 microns on the film, which corresponds to about 60 $\mu$ in the chamber. The useful area of film obtained at a 72" bubble chamber for example is roughly 3 cm. by 12 cm. Since most machines measure on a projected image of the film with a magnification of 10, this means a measurement to 40 microns on a 120 cm. by 30 cm. image. The required accuracy in the long direction is then $$\frac{40}{120,000} = \frac{1}{30,000}$$

or 3 parts in $10^5$. Expressed in binary terms, since 30,000 is approximately $2^{15}$, this is a measure to 15 bits in the long ($y$) direction and 13 bits in the $x$ direction. A measurement of this degree of accuracy is inherently difficult to obtain. It can be seen that the fabrication costs of the high precision gears or ways of the motion producing elements of the scanning stage become exorbitant in these ranges of sensitivity. The difficulty associated in the operational maintenance for such precision rises comparably and is compounded when high-precision servo-mechanisms, which are inherently difficult to maintain, are also used.

In addition to machine down-time required for maintenance, the overall scanning efficiency is further reduced by a lack of verification of the measuring data obtained. The information output of these prior machines has in general been in the form of paper or tape data storage for subsequent analysis by a computer. It can be seen that when incomplete or erroneous data is revealed in the later course of analysis the film source of the questionable data has left the scanning table. Consequently these films must be returned and individually reprocessed in a separate run. Present computer facility and programming methods have made it possible to improve this condition somewhat by modification of the information output form of the machines for more immediate computer analysis. However, these modifications are complex and costly and since the improvement is often limited by inherent design features of the machine, it does not approach the degree of flexibility which complete on-line operation with the computer and a continuous two-way communication therebetween will provide.

Improved bubble chamber techniques and advanced photographic recording methods which have evolved since the initial development of the rapid measurement machines are producing data at a continually increasing rate. The initial and operational costs of these prior forms of fast measuring mechanisms indicate that installation of sufficient additional units to handle the new rates of data production and to better utilize available computer capacity is not economically feasible. Thus there exists a critical need for a more efficient and economical rapid measurement system.

Accordingly, the present invention is a film scanning and track measuring device which makes use of an entirely different form of co-ordinate measurement as applied to filmed data analysis and which overcomes the limitations hereinbefore discussed with respect to the conventional systems in present use.

The invention uses a "benchmark" system of measurement, similar to that employed in the field of land surveying, and wherein two easily made measurements of relatively low accuracy are substituted for the single but highly precise measurement required of the previous track measuring techniques. This is effected by use of a benchmark plate in conjunction with the scanning-measuring table which plate contains a grid work of accurately and well-known positioned "benchmarks." By measuring the distance from a point on the track to a nearby benchmark, using a low precision correction, and adding these "differential co-ordinates" to the accurately established co-ordinates of the benchmark, the resultant absolute co-ordinates of points on the track will be of a much higher overall percentage accuracy than would be expected from the relatively simple measurement of the "differential co-ordinates." The previously mentioned problem of measuring the bubble co-ordinates to 15 binary bits is reduced to one of making two measurements of 7 or 8 binary bits each, or an accuracy of approximately one-half percent. Measurements of this precision can easily be made with either analogue or digital devices. Thus it can be seen that the apparatus required for the present invention represents a far less costly installation and the measuring process is a faster and simpler operation for the same degree of accuracy as obtained from the mechanisms heretofore available.

No self-tracking servo-mechanisms need be employed and the apparatus requires only moderate manual track-tracing concentration on the part of the operator. In addition, the system is designed for complete on-line operation with a computer whereby all data is verified and analyzed as the scanning proceeds, and alternate computer programs are available for different modes of the data analysis.

It is accordingly an object of the invention to provide an improved means for automatically measuring and recording the co-ordinates of points along a line or curve.

It is an object of the present invention to facilitate the analysis of experimental data in the field of nuclear physics.

It is a further object of the invention to provide an improved film scanning and measuring apparatus for use in the analysis of bubble chamber data which apparatus utilizes a benchmark measurement technique to obtain high accuracy without requiring extremely high precision component mechanisms.

It is another object of the invention to provide a scanning and measuring apparatus having high operational reliability.

It is a further object of the invention to provide an automatic means for obtaining highly accurate measurements of points along a line or curve with respect to a major reference by making two measurements of lesser accuracy with respect to a gridwork of known locations from the major reference.

It is still a further object of the invention to provide a film scanning and measuring apparatus which operates in direct communication with a computer whereby immediate verification and analysis of the scanning data may be obtained.

Figure 2:
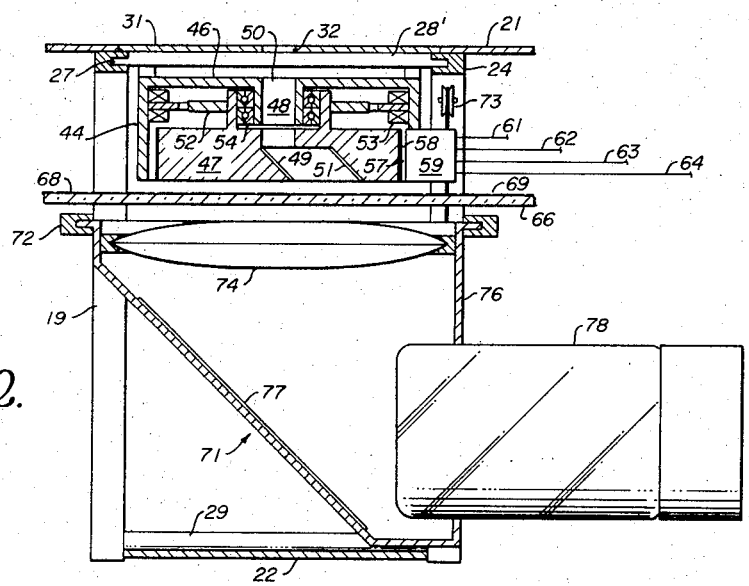
Figure 3:
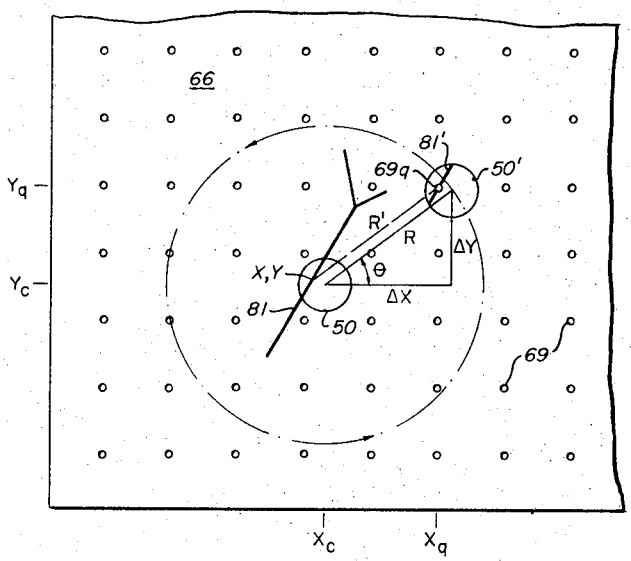

The invention, both as to its organization and method of operation, together with further objects and advantages thereof, will be best understood with reference to the following specification taken in conjunction with the accompanying drawing, of which:

FIGURE 1 is a broken-out perspective view of the scanning-measuring table of the invention, FIGURE 2 is a section view taken along line 2—2 of FIGURE 1, FIGURE 3 is a diagrammatic view illustrating part of the process by which measurements are made by the apparatus of FIGURES 1 and 2, FIGURE 4A is a first portion of a block diagram showing salient features of the circuitry of the invention, and FIGURE 4B is the second portion of the block diagram of FIGURE 4A.

Referring now to the drawing and more particularly to FIGURE 1 thereof, there is shown the scanning-measuring table 11, at which table the film scanning operator is stationed. The reel of film 12 containing the bubble chamber data or the like to be measured is located in a projector device 13 at the scanning station. Each of such reels 12 contain three stereoscopic exposures of the chamber, for each event to be analyzed, whereby each view may be projected in sequence. The image of an exposure on the film 12 is directed from the projector 13 onto a mirror 14 disposed a substantial distance above the scanning table 11 and is thereby reflected down onto a horizontal scanning screen assembly 16 at the table 11 as a pattern of dark tracks on a light background. This long light path reduces the angle of divergence of the light beam for the magnification obtained. This is necessary in the present invention in order to eliminate parallax cut-off in the optical system as will hereinafter be discussed. The minimum folding of the long light path reduces light loss from reflections and reduces image distortion at the scanning table.

The scanning table 11 is framed in a metal housing 17 provided with a large rectangular opening 18 in the upper surface for the image screen 16 elements. A movable carriage 19 spans the opening 18 in order to support two sliding curtains 21 and 22 which form the image screen 16 of the scanning table 11 and in order to provide a movable support for optical apparatus disposed within the housing 17 as will hereinafter be described. The carriage 19 is supported at its upper ends in machined ways 23 situated beneath opposite edges 20 and 25 of opening 18 and is smoothly slidable throughout the length of the opening by travel along the ways 23.

The carriage 19 essentially is a frame structure having a first pair of slender parallel rails 24 and 24' extending across the housing opening 18 and lying in the plane of the image screen 16. The larger sliding curtain 21 is a flexible opaque belt having one edge affixed to carriage rail 24, and extending in a continuous band around horizontal roller bars 26 mounted near the corners of housing 17, the other end of the curtain 21 being attached to carriage rail 24'. Thus motion of the carriage 19 in the ways 23 slides screen curtain 21 longitudinally in opening 18, hereinafter referred to as the $y$ co-ordinate direction of the scanning surface.

Machined ways 27 are provided along the inner edges of carriage rails 24 and 24' whereby a second pair of parallel rails 28 and 28', shorter than rails 24 and 24' and disposed orthogonal thereto, may travel across opening 18 of the scanning table. The smaller sliding curtain 22 which is also flexible and opaque is stretched in bandlike fashion around four roller bars 29 that are disposed at the corners of carriage structure 19. The small curtain 22 is affixed at the ends to the spaced apart parallel rails 28 and 28'. A metal plate 31 containing a centrally located tracking aperture 32 is affixed to the shorter carriage rails 28 and 28' and extends therebetween to form the remaining surface area of the image screen 16. Thus the plate 31 and smaller screen curtain 22 are movable in what will be called the $x$ co-ordinate direction of the scanning table by the motion of second carriage rails 28 and 28' along the ways 27 of first carriage rails 24 and 24'. The combined orthogonal motions of the two screen curtains 21 and 22 allows the tracking aperture 32 to be moved in any selected direction along a particle track in the stationary projected image while providing a continuous surface for the image screen 16. A push-button type electrical switch 35 is mounted in aperture plate 31 and is connected to the data output circuitry. The button 35 is depressed in the "on" position during the measuring process and provides a record command signal to the circuitry, as will hereinafter be more fully described.

The curtains 21 and 22 may be formed of thin Mylar sheet which has been made opaque by aluminizing in a vacuum coating process. The outer surfaces of the curtains are white to provide a good scanning background while the under surfaces thereof are dull black to act as a light absorber. The two surfaces of the aperture plate 31 are similar. The curtains 21 and 22, aperture plate 31, and the table housing 17 thus combine to form a light tight enclosure.

A coarse digitizing system of the picket fence type is associated with each of the sliding curtains 21 and 22 in order to give the rough position of the tracking aperture 32 with respect to the $x$ and $y$ co-ordinate axes of the image screen 16. The picket fence pattern of alternate opaque and transparent grating lines 33 is provided at one edge of larger curtain 21 along the portion thereof which is lowermost in the table housing 17. A pair of adjacent pin light sources 34 are housed directly above the curtain edge, in vertical alignment with a pair of adjacent photodiodes 36 disposed beneath the grating pattern 33 to respond to light transmitted therethrough. Thus the motion of the aperture 32 in the $y$ co-ordinate direction is detected by the passage of the grating pattern 33 through the pin light beams 34 as indicated by the photodiode 36 output pulses resulting therefrom. The direction of the motion (plus or minus $y$) is further indicated by the phase relationship between the signals from the two photodiodes. In order that this motion may be related in the hereinafter described output circuitry to the assumed $y$ co-ordinate origin of the scanning screen 16, a single index grating line 37 is provided on the opposite edge of curtain 21. A single pin light and photodiode unit 38 is mounted at this side of the housing 17 to detect passage of the index mark 37 therebetween and to provide a reset signal to the output circuitry. A suitable co-ordinate axis origin location on the screen 16 would be either the geometric center of the screen area or a lower corner thereof.

A similar coarse digitizing system is provided for sensing the position of the smaller curtain 22 by means of a second grating pattern 39 along the edge thereof. The double pin light and photodiode unit 41 in this case is mounted on a vertical member of the carriage frame 19. An $x$ co-ordinate origin position of the tracking aperture 32 is similarly indicated by a suitably located index marking 42 on the other edge of curtain 22 and a single pin light photodiode detector unit 43 mounted on an opposite vertical member of carriage 19. The grating patterns 33 and 39 of the coarse digitizing systems in the present embodiments of the invention have sixteen lines per centimeter. Measurements of this low accuracy are easily made and the apparatus and circuitry therefor is simple, inexpensive and reliable.

Considering now the optical apparatus mounted on carriage 19, with reference to FIGURE 2 in conjunction with FIGURE 1, there is shown a small upright drum 44 directly beneath the aperture plate 31. The drum 44 depends from rails 28 and 28' which attach to a stationary outer shell 46 of the drum. An inner rotatable portion 47 of the drum 44 contains an optical periscope 48 whereby the image admitted through tracking aperture 32 is radially displaced by mirrors 49 and 51. The inner drum section 47 may be rotated within shell 46 at 1200 r.p.m. by a small synchronous hysteresis type motor of which the rotor 52 is affixed to the inner drum 47 and the stator 53 is secured to the shell 46. Bearings 54 are provided to reduce friction between the shafts of the drum sections 46 and 47.

Thus rotation of the drum 47 sweeps the image admitted by the periscope entrance iris 50 in a circular path. The instantaneous angular position of the inner drum 47, and thus of periscope 48 is continuously indicated by a magnetic read-out and pick-up system 57 associated therewith. The periphery of the drum section 47 is coated with an epoxy based magnetic film 58 and four separate bands of permanently recorded magnetic information are stored thereon. A read-out head 59 is mounted on the stationary drum shell 46 and contains a separate magnetic pick-up for each of the information bands of the drum 47 with the separate outputs 61, 62, 63 and 64 thereof supplying discrete positioning signal data to the hereinafter described output circuitry.

The information contained on the magnetic film 58 for monitoring the angular position of the periscope exit is in the form of trigonometric functions throughout the 360° rotational path thereof. A first band contains pulses spaced according to a sine function and a second band identifies the quadrant and thus the sign of the function whereby the combined signals in the output circuit will provide a differential $x$ axis co-ordinate measure ($\Delta x$). A third band contains pulses spaced according to a cosine function, and the fourth band similarly indicates the quadrants and signs therefor to provide a differential $y$ co-ordinate measure ($\Delta y$). These differential measurements are actually $R \sin \Theta$ and $R \cos \Theta$, where R is the radial displacement from the entrance iris to the exit iris of the periscope and $\Theta$ is the instantaneous angle of the periscope with respect to the chosen 0° reference angle.

Referring now to FIGURE 3 in conjunction with FIGURE 2, a benchmark plate 66 having an area essentially equal to that of the image screen 16 is disposed within the scanning table 11 in a horizontal plane a slight distance below drum 44, the plate being mounted on horizontal beams 67 which attach to the table housing 17. The benchmark plate 66 comprises a glass plate having a dark photographic emulsion 68 overlaid on the upper surface thereof. The emulsion pattern is opaque except for a plurality of clear .020 inch diameter "holes" 69 developed therein, which are spaced one centimeter apart in a uniform rectangular array over the plate. The development of the emulsion is done by a contact printing process from an extremely accurately machined master plate. The holes 69, hereinafter referred to as benchmarks, provide the measuring system with a network of accurately known locations analogous to the benchmarks of land surveying techniques. The benchmark diameter of .020 inch is roughly equivalent to the diameter of the bubbles forming the particle tracks which are projected on the image screen 16.

Referring now again to FIGURES 1 and 2, a light collector unit 71 is disposed in housing 17 beneath the benchmark plate 66. The unit 71 is movably supported by a pair of additional rails 72 which are part of the carriage 19 structure, rails 72 being disposed parallel to rails 24 in a plane slightly below the benchmark plate 66. Unit 71 is oriented in vertical alignment with the drum 44 and tracking aperture 32. It can be seen that the light collector unit 71 is automatically movable with the aperture motion in the $y$ co-ordinate direction owing to its attachment to carriage 19. In order that the unit 71 follow the travel of aperture 32 and drum 44 in the $x$ co-ordinate direction, the light unit housing 76 is connected to the outer shell 46 of drum 44 by a line and pulley system 73. The line and pulley system 73 is arranged so that the unit 71 travel in the $x$ direction is similar to that of the drum unit travel in that direction.

The light collector unit 71 comprises a collector lens 74 disposed near the top of the unit housing 76. The lens 74 directs light transmitted through the periscope 48 downwardly onto a first surface mirror 77 contained in housing 76 and disposed at 45° to the optical axis of lens 74. Such rays are thereby reflected onto the photocathode of an end window type photomultiplier tube 78 suitably mounted in the housing 76. Since only the outer region of the collector lens is used, owing to the circular sweeping motion of periscope 48, the lens 74 may be annular in form.

Referring now to FIGURE 3 there is shown diagrammatically a typical path of the periscope image spot 50' over the benchmark plate 66. The diameter of the entrance pupil 50 of the periscope 48 is 0.6 cm. Since the benchmarks 69 are spaced 1.0 cm. apart, as the rotating periscope sweeps the image spot 50' in the circular path over the plate 66, the image spot will pass over only one benchmark at a time. During the sweep of the 0.6 cm. image spot across the single .05 cm. benchmark, light will be transmitted to the photomultiplier tube 78 by the benchmark and an output pulse will result therefrom for each such occurrence. This pulse will be of fairly constant amplitude throughout the travel of the spot 50' across the benchmark. If, however, there is a portion of a charged particle track 81 included in the image spot 50' as indicated in the figure by reference numeral 81', the light level on the photocathode will suddenly drop as track portion 81' moves onto the benchmark and then suddenly rise again as the track moves off the benchmark. The time center of the resulting sharp dip in the amplitude of the photomultiplier tube 78 output pulse thus indicates the instant at which the periscope image 81' of the increment of track 81 was exactly located on the particular benchmark. As can be seen from the geometrical relationships involved, if the co-ordinate location $(x_q, y_q)$ of the particular benchmark $69_q$ under track image 81' is known, upon appropriately adding or subtracting the differential co-ordinates $\Delta x$ and $\Delta y$ to $x_q$ and $y_q$, one may obtain the absolute co-ordinate position X, Y of the corresponding point on the particle path 81.

The differential co-ordinates $\Delta x$ and $\Delta y$ shown in FIGURE 3 are the previously mentioned differential measurements of the periscope rotational position as obtained from the magnetic information bands 58 on drum 47. The $x_c$ and $y_c$ co-ordinates shown in the figure are the previously mentioned coarse co-ordinate positions of the center of the tracking aperture 32 (which corresponds to the center of the periscope iris 50) on the image screen 16, as obtained by the picket fence digitizers 39 and 33 respectively associated with the screen curtains 21 and 22.

A suitable computer program may determine track co-ordinates from the output information developed by the above described structure. For every possible position $x_c$ and $y_c$ of the tracking aperture, the computer can distinguish which of the benchmarks can appear in the path of the periscoped image spot. If the instant of occurrence of the photomultiplier tube signal dip is related to the simultaneous instantaneous angular position of the periscope, the computer can immediately ascertain which of the benchmarks is being crossed by the track in the image spot. If the computer has the absolute co-ordinate positions of each of the benchmarks, then it can execute the previously described mathematics of appropriately adding or subtracting the differential co-ordinates $\Delta x$ and $\Delta y$ to the particular benchmark co-ordinates $x_q$ and $y_q$ to establish the absolute co-ordinate position X, Y of the corresponding point on the particle path.

Referring now to FIGURES 4A and 4B, there is shown circuitry for handling the measuring data produced by the hereinbefore described apparatus for use by such a computer program. In FIGURE 4A the double photodiode unit 41 of the picket fence coarse digitizing system associated with screen curtain 22 of the scanning table 11 is shown schematically. The outputs of the photodiode pair 41 are coupled to inputs 82 and 83 of a first Ferranti type reversible scaler 84 wherein the input digitizing pulses are added to the scaler 84 count for motion of the tracking aperture 32 in the positive x co-ordinate direction and are subtracted from the scaler count for aperture motion in the negative x co-ordinate direction. The output of the single photodiode 43 associated with index mark 42 of curtain 22 is coupled to a third input 86 of scaler 84 whereby the reset signal from the photodiode 43 sets the count stored on the scaler to an appropriate number corresponding to the position on the screen 16 of the selected x-axis origin. It can be seen that if the location of the index mark 42 on the curtain 22 exactly corresponds to the x-axis origin position of the aperture 32 with respect to screen 16, the scaler 84 would be reset to a zero count. If for any reason there is not this direct correspondence, the difference can be accommodated for by an appropriate reset number in the scaler 84. The outputs of the double photodiode unit 36, associated with curtain 21 for digitizing the aperture 32 motion in the y co-ordinate direction, are coupled to inputs 87 and 88 of a second Ferranti type reversible scaler 89. The operation of reversible scaler 89 is similar to that of scaler 84 and the scaler 89 count is appropriately reset by the y-axis origin index pulse from single photodiode 38 as received at a third input 91 thereof. The sixteen line per cm. grating patterns 33 and 39 of the coarse digitizing systems thus produce a count in the scalers 84 and 89 for each $\frac{1}{16}$ cm. of orthogonal translations of the aperture 32 on image screen 16. The scalers 84 and 89 thus contain the previously mentioned $x_c$ and $y_c$ measurements respectively.

As hereinbefore described, the read-out head 59 of the magnetic data system 57 of periscope drum 47 is provided with four pick-up outputs 61, 62, 63 and 64 for the four separate bands 58 of angular positional information stored on the drum. The first pick-up output 61, which is associated with the information band containing the sin ⊕ pulses, is coupled to a first input 92 of a third Ferranti type reversible scaler 93. These pulses, spaced on the drum according to a sine wave variation, correspond to equal increments of $\frac{1}{128}$ cm. of linear displacement of $R$ sin ⊕ which is the previously discussed differential measurement $\Delta x$. This measurement is limited between $R$ sin ⊕$=O$ and $R$ sin ⊕$=R$. The output 62 of the second pick-up of read-out head 59, associated with the information band on drum 47 containing the sign and quadrant data of the sine function of pick-up 61, is coupled to a first input 94 of a direction logic circuit 96, to be hereinafter described. Pick-up output 64 of read-out head 59 is coupled to a first input 97 of a fourth reversible scaler 98. The pick-up 64 is associated with information band 58 containing the $R$ cos ⊕ pulses and thus provides the differential measurement $\Delta y$ in a manner similar to that described with respect to $\Delta x$. The pick-up output 63, containing the sign and quadrant data of the cosine function of pickup-up 64, is coupled to a second input 99 of direction logic circuit 96.

The data received at inputs 94 and 99 of the direction logic circuit 96 is in the form of single pulses occurring at the drum quadrant angles 0°, 90°, 180° and 270° which pulses are of the appropriate positive or negative polarity to indicate the direction during the quadrant of the respective sine and cosine functions associated therewith. Thus, for example, the data arriving at input 94 from the sign pick-up output 62 associated with the sin ⊕ function of pickup 61 would be a positive pulse at 0° since the sine function has positive direction during the first quadrant. The pulses at 90° and 180° would be negative to indicate the negative slope of the function during the second and third quadrants, followed by a positive pulse at 270°.

A first output 101 of the logic circuit 96 applies the quadrant sign pulses from input 94 to a second input 102 of the $\Delta x$ scaler 93 whereby the scaler is commanded to appropriately add or subtract the $\Delta x$ counts arriving at input 92 thereof. A second output 100 of the logic circuit 96 is coupled to a third input 95 of the $\Delta x$ scaler and applies a reset signal thereto at the 0° and 180° positions of the drum whereby the scaler count is reset to zero. A third output 103 of the logic circuit 96 similarly applies an add or subtract command signal to the $\Delta y$ scaler 98 at second input 104 thereof, and a fourth output 105 coupled to scaler input 110 provides a reset-to-zero command thereto at the 90° and 270° drum positions. The fifth output 106 of the logic circuit 96 provides a signal indicative of a completed revolution of the periscope drum 47 which signal pulse may occur at any selected quadrant index angle of the drum position and which signal shall hereinafter be referred to as the origin pulse.

The photomultiplier tube 78 of the light collector unit 71 is shown with the output thereof connected to the input of a pulse center finder circuit 115. The pulse center finder 115 acts on the incoming photomultiplier 78 pulses which have the previously discussed sharp amplitude dip therein and accurately locates the time center of such a dip whereupon it produces a "strobe" pulse at an output 107. As previously described, such a strobe pulse indicates the instant of location of the track image 81' (shown in FIGURE 3) over a benchmark 69.

For any given location $x_c$, $y_c$ of the tracking aperture 32, a single revolution of the periscope 48 will provide all the meaningful information available from that position. Any further revolutions would merely continue the sweep over the same benchmarks 69. The redundant information obtained thereby would be repeatedly recorded and soon overload the data handling and storage capacity of the equipment. For this reason a redundant information gate 108 is provided whereby even though the drum 44 continues to rotate at a given location the information is admitted from only the first completed drum revolution. For new data to be accepted, the tracking aperture 32 must have moved a small pre-determined distance (0.5 cm.) in either direction on the scanning table 11.

The redundant information gate 108 has a first input 109 coupled to output 107 of the pulse center finder 115 to receive the strobe pulses therefrom. A second input 111 is coupled to the output 106 of direction logic circuit 96 to receive the drum origin position pulses therefrom. Receipt of a first origin pulse at input 111 gates the circuit 108 "on" whereupon the origin pulse is transmitted at a first gate output 112 as an enabled origin pulse and the strobe pulses subsequently received are transmitted at a second gate output 113 as enabled strobe pulses. Receipt of a second origin pulse at input 111, indicative of a completed first revolution of periscope drum 47, de-energizes the gate 108. In order to be re-energized, the gate 108 must receive a gating signal at either of two further inputs 114 and 116 thereof, respectively coupled to output 117 of $x_c$ scaler 84 and output 118 of $y_c$ scaler 89. Each of the scalers 84 and 89 produce an output pulse for every eight additive input pulses thereto corresponding to 0.5 cm. of aperture 32 translation as required for new strobe information to be recorded. Thus receipt of such a pulse at either of gate inputs 114 and 116 re-energizes the gate 108 and the first received origin pulse thereafter will be transmitted as an enabled origin pulse, and subsequent strobe pulses will be transmitted as enabled strobe pulses, until the gate is again de-energized by receipt of the second origin pulse.

Referring now to FIGURE 4B in conjunction with FIGURE 4A, the further circuitry which will now be described essentially comprises four similar digitized information channels respectively associated with each of the scalers 84, 89, 93 and 98, in addition to gating means for selectively transferring the digitized information.

The output 119 of $x_c$ scaler 84 is coupled through a coincidence gate 121 to input 122 of an $x_c$ register 123. The output 124 of the $y_c$ scaler 89 is coupled through a similar coincidence gate 126 to input 127 of $y_c$ register 128. In order to obtain the coarse positioning of the aperture 32 at the time of the enabled information sweep of the periscope 48 the enabled origin pulse from redundancy gate 108 is applied as a trigger signal to $x_c$ gate input 129 and to $y_c$ gate input 131. Thus upon the occurrence of the enabled origin pulse the instantaneous $x_c$ and $y_c$ co-ordinate position counts stored in scalers 84 and 89 are simultaneously transferred to the read-out registers 123 and 128.

The output 129 of $\Delta x$ scaler 93 is coupled through coincidence gate 130 to the input 132 of $\Delta x$ register 133. Similarly, the output 134 of $\Delta y$ scaler 98 is coupled through coincidence gate 136 to the input 137 of $\Delta y$ register 138. Since it is necessary to know the differential co-ordinates of the periscope 48 position at each occurrence of a strobe pulse throughout the enabled information sweep, the enabled strobe output 113 of redundancy gate 108 is connected to the trigger inputs 139 and 141 of the $\Delta x$ and $\Delta y$ gates 130 and 136, respectively. Thus for each occurrence of an enabled strobe pulse the instantaneous angular position of the periscope 48, as stored in the $\Delta x$ and $\Delta y$ scalers, is transferred to the respective read-out registers 133 and 138. As previously discussed, these registered $\Delta x$ and $\Delta y$ counts correspond to the differential co-ordinates of the iris image spot 50' center relative to the real iris 50 center of the periscope 48.

The circuitry as so far described is automatically actuated by the motion of the tracking aperture 32 over the image screen 16 in order that the counts in the four digitizing channels are kept in accurate correspondence with the aperture position and the periscope angular position at all times. In order that only the tracking data which is to be analyzed is admitted to the computer, gating of the four register outputs is employed.

During the tracking of aperture 32 along a pattern of interest on the image screen 16, the previously described record button 35 on the aperture plate 31 must be depressed to the "on" position. The record button 35 is connected to a first input 142 of a coarse and differential interlacing circuit 143, which circuit receives the enabled origin pulse and the enabled strobe pulse respectively at inputs 144 and 146 thereof. The interlacing circuit acts as a gate which is energized only during the presence of the input 142 record signal. During the energized state, the enabled origin pulse from output 147 of the interlacing circuit 143 provides a trigger signal to inputs 148 and 149 of a pair of "and" gates 151 and 152 respectively. The "and" gates 151 and 152 are further coupled between the respective outputs of the $x_c$ register 123 and $y_c$ register 128 and separate inputs 153 and 154 of a common "or" gate 156 of the computer data input network. Thus the $x_c$ and $y_c$ counts contained in the registers 123 and 128 which are to be analyzed are transferred to the "or" gate 156.

Similarly, the second output 157 of the energized interlacing circuit 143 applies the enabled strobe pulses as trigger signals to the inputs 158 and 159 of second pair of "and" gates 161 and 162, respectively. These gates are separately coupled between the outputs of the $\Delta x$ and $\Delta y$ registers 133 and 138 and additional inputs 163 and 164 of the common "or" gate 156. The enabled strobe pulses thereby transfer the counts of the $\Delta x$ and $\Delta y$ registers to be analyzed to the "or" gate 156.

The "or" gate 156 is of the type which accepts the signals at the inputs 153, 154, 163 and 164 thereof in the order of their arrival whereby the information available from any of the four digitizing channels is held for acceptance by a first switchboard multiplixer 166 of the data input 167 to a computer 168 which may be an IBM 709 type. To make optimum use of the computer, the multiplexer 166 can receive digitized data from additional scanning-measuring projectors as indicated at inputs 169 and 171 thereof. The multiplexer 166 enables the computer 168 to sample all the direct data output lines 172, 169 and 171 at its convenience. This data is channelled to the computer memory without interruption of the computer analysis program. If the computer memory is full, the program may be interrupted to set up new data storage space or to clear the presently full space.

Communication with the computer 168 by the scanning operator is by means of an electric typewriter 173 disposed at the scanning station. The typewriter 173 is connected in two-way sense communication, as indicated by arrows 174, to a second switchboard multiplexer 176. Additional typewriters associated with additional scanning-measuring projectors may also communicate with the switchboard 176 by the indicated connections 177 and 178. The switchboard multiplexer 176 has a first set of sense lines 179 for data-interrupt commands to the computer 168 from the scanning operator. A second set of sense lines 181 carry information messages typed by the operator to the computer. A third set of sense lines 182 carry information messages typed by the computer to the operator. As will hereinafter be discussed in more detail, the computer 168 signals the operator to supply information which may be needed or delivers information to the operator on the typewriter 173 in red type. The operator replies to or gives commands to the computer in black type. The typewriter is of a type which prints only capitals and numerals and has certain characters reserved for special purposes.

Considering now the operation of the invention, with reference to all figures of the drawing, the bubble chamber film 12 is loaded in the projector 13 and one of the three stereoscopic views of the frame to be scanned is projected on the image screen 16 of the scanning table 11. In measuring a selected event the operator examines the three views of the event, selects the best view for measurement, and signals to the computer 168 via typewriter 173 that he wishes to measure. A responding signal from computer 168 asks for indicative data such as the experiment name, the film frame number, the scanning operator's name, etc. Upon receiving this data in proper form, the computer transmits a signal to the operator to proceed with the measurement. After measuring the fiducial marks which are provided on the bubble chamber film to give a reference frame for the track measurements made on that film, the operator moves the tracking aperture 32 to a particle path to be measured.

The operator holds the record button 35 at the "on" position and guides the aperture 32 along the track 81 which is to be measured, merely keeping the track somewhere within the aperture. The motion of the aperture 32 along the screen 16 is sensed by coarse digitizers 34 and 41 respectively associated with the two sliding screen curtains 21 and 22 and the coarse co-ordinates $x_c$ and $y_c$ of the aperture 32 center are counted by the $x_c$ and $y_c$ scalers 84 and 89. During the aperture translation, the rotating drum 47 spins the periscope 48 in its circular path over the benchmark plate 66. Each time the periscope image spot 50' passes the track over a benchmark 69 on plate 66, the strobe pulse from the photomultiplier tube 78 is synchronized within the counting circuitry whereby the instantaneous angular position of the periscope 48 at the instant of the strobe, as counted by the $\Delta x$ and $\Delta y$ scalers 93 and 98, is registered in the "or" gate 156 along with the instantaneous $x_c$ and $y_c$ co-ordinates of the aperture. This data is transferred by the multiplexer 166 to the computer 168 for computation and analysis.

Thus, for each strobe unit of data the computer is provided with the position of the tracking aperture 32 center (and thus the periscope 48 iris 50 center) from the $x_c$ and $y_c$ counts. The computer is also provided with data on the instantaneous angle ⊕ of the periscope at the time of the strobe by the relative relationship of the $\Delta x$ and $\Delta y$ counts.

For a particular $x_c$, $y_c$ position of the periscope iris 50 center and for that particular angle ⊕ of the periscope rotation, there can be only one unique benchmark $69_q$ which would be covered by the periscope image iris 50' and this can be determined by the computer owing to the programming thereof. The computer also has been programmed with the co-ordinate locations, and thus the identification or name, of every benchmark 69 of the benchmark plate 66. Having ascertained the name of this particular benchmark $69_q$, the computer has also ascertained its location $x_q$, $y_q$ to a very high accuracy.

As can be seen in FIGURE 3, the $\Delta x$ and $\Delta y$ measurements which relate the center of the real iris 50 to the center of the image iris 50' will similarly relate any other corresponding points within the real iris spot and the image iris spot. Thus, adding (or subtracting) the differential co-ordinate distances $\Delta x$ and $\Delta y$ to the benchmark co-ordinate locations $x_q$ and $y_q$ will identify a point X, Y in the real iris spot 50, corresponding to the benchmark point $x_q$, $y_q$ in the image iris spot 50'. This point X, Y is the location of this measured point of the particle track on the image screen 16.

As the periscope 48 continues to turn at a relatively high speed beneath the aperture 32 as the aperture moves along the track 81, a large number of track points are picked up and measured by the computer as described above. These points are averaged by the computer to yield a smaller number of very accurate points along a "smooth" curve, from which the computer reconstructs the particle track. Any dark points in a lighter area of the tracking aperture 32 will cause a point to be registered. These stray spots, such as electron "pigtails" crossing the tracks, or other extraneous markings, are filtered out by programming the computer to recognize and discard patterns that do not form a smooth line.

The vertices of charged particle events may be measured by tracking a short distance along each of the two tracks originating therefrom. The computer may then determine the point of intersection of these lines.

The data is accumulated in a buffer storage of the computer 168. When the operator signals the computer that he has completed the measurement, this data is quickly processed, filtered, etc. If this data has been acceptable, the computer signals a request for the next measurement. If not, the computer types out a coded error signal and requests remeasurement.

When the last measurement has been satisfactorily completed, the computer stores the event data on magnetic tape in a form directly usable in the subsequent kinematic analysis of the events by the experimenter. A more detailed discussion of a computer program which can be used for the above-described data handling and analysis by an IBM-709 computer is available in a Lawrence Radiation Laboratory Report No. UCRL 10109, entitled, "SMP-1 Scanning and Measuring Projector," written by L. W. Alvarez et al., dated Apr. 10, 1962 and first released for distribution as a publication on June 27, 1962.

Thus the invention provides a very rapid and highly accurate means for the automatic measurement of bubble chamber data or other data which exists in the form of curves or lines within an image. By best exploiting the capabilities of modern data processing equipment, the invention provides a scanning and measuring rate higher than has heretofore been effected. By utilizing the unique benchmark approach to the measuring procedure, the necessary accuracy built in to the equipment is far reduced from that required of conventional apparatus in the art. While high precision is required in the manufacture of the benchmark plate 66, the greatest cost is represented by the single master plate from which many additional plates can be made at very low expense. And, while the rotating periscope 48 is the most intricate part of the apparatus, it is of sufficient simplicity relative to other measuring means, that the invention is overall, economical to build, simple to operate and easy to maintain.

While the invention has been disclosed with respect to a preferred embodiment, it will be apparent that numerous variations and modifications may be made within the spirit and scope of the invention and it is not intended to limit the invention except as defined in the following claims.

What is claimed is:

1. Apparatus for facilitating the determination of the co-ordinates of points on a curve comprising, in combination, means forming an image containing said curve, an opaque element having an aperture for transmitting a portion of said image including a selected portion of said curve, means by which said aperture may be moved relative to said image whereby said aperture may be tracked along said curve, an opaque benchmark plate having a plurality of light transmissive points distributed at known positions thereon, said benchmark plate being disposed to receive the portion of said image transmitted through said aperture, means for sweeping said portion of said image relative to said benchmark plate in a systematic recurring movement thereon, a photosensitive element disposed to receive light from said image portion which is transmitted through said transmissive points of said benchmark plate and producing a signal when said transmitted light momentarily changes intensity owing to the presence of said curve in said image portion, a first means registering the position of said aperture upon receipt of said signal from said photosensitive element, and second means registering the position of said sweeping means in said recurring movement thereof upon receipt of a signal from said photosensitive element.

2. In apparatus for aiding in locating and measuring a curve, the combination comprising, an opaque curtain containing an aperture, means for projecting an image containing said curve on said curtain, means for selectively moving said aperture relative to said image to track said aperture along said curve, a benchmark screen disposed to receive the portion of said image which passes through said aperture, said benchmark screen being provided with a multiplicity of accurately positioned minute light transmissive points equally distributed over an otherwise opaque surface thereof at known locations thereon, a periscope disposed between said curtain and said benchmark screen with the entrance pupil thereof viewing said aperture in said curtain and the exit pupil thereof laterally displaced therefrom, said periscope being automatically movable relative to said image in synchronism with said curtain, means rotating said periscope about the axis of said entrance pupil whereby the image from said exit pupil is swept in a circular path over said benchmark screen, a first positioning sensing means registering the instantaneous position of said aperture relative to said image, a second positioning sensing means for registering the instantaneous rotational position of said periscope exit pupil, and photoelectric means disposed to receive light transmitted through said light transmissive points of said benchmark screen and producing a signal when said transmitted light momentarily changes intensity owing to the presence of said curve in said image, said signal acting to initiate the release of data from said first and second positioning sensing means.

3. In apparatus for aiding in determining the co-ordinates of a curve, the combination comprising means forming a projected image which image contains said curve, a screen disposed in the path of said projected image, said screen being generally opaque and having a single relatively small light transmissive area provided therein, said screen being movable within its own plane whereby said light transmissive area may be guided along said curve within said image, means for measuring the motion of said screen with respect to a co-ordinate reference system, a benchmark plate disposed parallel to said screen and spaced therefrom, said plate being generally opaque and having a plurality of minute transparent areas regularly spaced at known locations thereon with respect to said co-ordinate reference system, an optical periscope disposed between said screen and said plate with the entrance iris thereof directed at the light transmissive area of said screen and being movable therewith, means rotating said periscope about the optical axis of said entrance iris thereof whereby the exit iris thereof sweeps the transmitted increment of said image in a circular path over separate ones of said minute transparent areas of said benchmark plate, means for measuring the rotational position of said periscope with respect to a fixed reference angle thereof, a phototube responsive to light transmitted by said minute transparent areas of said benchmark plate, pulse center finder circuitry coupled to the output of said phototube and producing an output pulse upon the occurrence of an input signal thereto which displays a sharp narrow dip in amplitude level, such dip being indicative of the passage of the transmitted image of said curve increment over one of said minute transparent areas in said plate, and output gating means passing the instantaneous measured position of said screen and the instantaneous measured angle of said periscope upon receipt of an output pulse from said pulse center finder circuitry.

4. A film scanning device for use with photographed bubble chamber data or the like comprising, in combination, film projector means for projecting a stationary image of the film to be scanned which image contains a particle track to be measured, an opaque screen on which said image is projected, said screen having a relatively small opening therein which opening forms a scanning aperture, said screen being translatable along each of two perpendicular axes whereby said scanning aperture may be moved along said image of said track, a first digitizer coupled to said screen and recording the translation thereof along a first of said axes, a second digitizer coupled to said screen and recording the translation thereof along the second of said axes, counting circuitry coupled to the outputs of said first and second digitizers to record the orthogonal translation of the aperture in said screen with respect to a fixed reference position thereof, an opaque plate disposed parallel to said screen, said plate being provided with a plurality of minute light transmissive benchmarks in a regular array thereover each of which benchmarks denotes a unique and accurately located co-ordinate measuring position, a rotatable drum disposed between said screen and said plate, an optical periscope coaxially secured to said drum and disposed with the entrance iris thereof aligned with the scanning aperture of said screen whereby rotation of said drum sweeps the image portion transmitted therethrough in a circular path over said plate, said drum and periscope being movable with said screen, angular measuring means associated with said drum and continuously recording the rotational position thereof with respect to a fixed reference angle of said periscope therein, a phototube responsive to light transmitted by said benchmarks, a pulse center finder circuit coupled to said phototube and producing a strobe pulse upon the occurrence of an input signal thereto which contains a sharp narrow dip in amplitude level, such dip being indicative of the instantaneous superposition of the scanned increment of said track image upon one of said plurality of benchmarks, and a gating circuit having a first input coupled to the output of said screen position counting circuit and having a second input coupled to the output of said drum position recording means, said gating circuit having a gating input coupled to the output of said pulse center finder whereby occurrence of a strobe signal therefrom gates said first and second input signals to first and second outputs thereof respectively.

5. Apparatus as described in claim 4 wherein the position recording means associated with said drum comprises a magnetic substance coated on the periphery of said drum, said magnetic coating having four separate bands of trigonometric information magnetically stored thereon with respect to a common index angular position thereof, the first of said bands containing pulses spaced according to the amplitude variation of a sine wave, the second of said bands containing pulses of polarity according to the quadrant sign of the sine wave of said first band, the third of said bands containing pulses spaced according to the amplitude variation of a cosine wave, and the fourth of said bands containing pulses of polarity according to the quadrant sign of the cosine wave of said third band, and a magnetic read-out head slightly spaced from the periphery of said drum and secured thereat to be translatable with said drum, said read-out head having four separate magnetic pick-ups respectively aligned with the four information bands of said magnetic coating whereby rotation of said drum sweeps said coating past said read-out head and the magnetic pulses imparted thereto are indicative of the rotational position of said drum with respect to said index position.

6. Apparatus as described in claim 4 wherein said opaque plate comprises a clear glass plate having a configuration similar to that of said scanning screen, and a dark photographic emulsion coated on the surface of said plate which faces said screen, said photographic emulsion having developed therein a plurality of minute transparent points each having a diameter essentially equal to the average width of said projected image of said particle path and being disposed in said emulsion in a rectangular array, the spacing of which array is just great enough that only one of said points may intercept the portion of said image transmitted through said periscope at any one position thereof.

7. A scanning-measuring projector for aiding in determining co-ordinate points along a curve comprising, in combination, a projector for projecting a stationary image containing said curve to be measured, a scanning screen on which said image is projected, said screen having a light transmissive scanning aperture provided in the otherwise opaque surface thereof, said screen being movable in any direction within its own plane whereby said aperture therein may be selectably guided along said curve to be measured, a first digitizer associated with said screen and responsive to motion thereof in a first co-ordinate reference direction, a first counting circuit coupled to said first digitizer and continuously registering the position of said scanning aperture with respect to the origin of said first reference direction, a second digitizer associated with said screen and responsive to motion thereof in a second orthogonal co-ordinate direction, a second counting circuit coupled to said second digitizer and continuously registering the position of said scanning aperture with respect to the origin of said second reference direction, a scanning table housing having said screen as one wall thereof and forming a light-tight enclosure therewith, a small drum mounted in said housing at the scanning aperture in said screen and being movable therewith, an optical periscope mounted in said drum and disposed with the entrance iris thereof aligned with said scanning aperture, means rotating said drum about the axis thereof whereby the exit iris of said periscope therein is swept in a circular path, magnetic digitizing means associated with said drum and responsive to the instantaneous rotational position thereof, a third counting circuit coupled to a first output of said magnetic digitizing means and registering the differential co-ordinate position of said periscope exit iris with respect to said scanning aperture along said first reference direction, a fourth counting circuit coupled to a second output of said magnetic digitizing means and registering the differential co-ordinate position of said periscope exit iris with respect to said scanning aperture along said second orthogonal reference direction, a stationary opaque plate disposed parallel to said movable screen and adjacent said periscope exit iris, said plate being provided with a plurality of light transmissive holes in an orthogonal array thereover, the spacing of said holes being just larger than the exit pupil diameter of said periscope whereby rotation of said drum sweeps the periscoped image from said scanning aperture over only one of said holes at a time, phototube means disposed to respond to light transmitted by said holes of said plate, and a pulse center finder circuit having an input coupled to said phototube and having a branched output coupled to respective gating inputs of said first, second, third and fourth counting circuits to energize the separate outputs thereof, said pulse center finder producing an output pulse upon the occurrence of a sharp amplitude change in the input signals thereto which change is indicative of the superposition of the periscoped image of said curve upon one of said holes of said plate whereby the instantaneous counts from said four counting circuits identify the location of the superimposed hole in said plate and the instantaneous counts from said third and fourth counting circuits further identify the differential coordinate displacement from said superimposed hole in said plate of the corresponding point on said curve on said screen.

8. Apparatus as described in claim 7 wherein said first and second digitizers associated with said scanning screen to respond to orthogonal motion thereof are in the form of picket fence grating patterns separately provided along two mutually perpendicular edges of said screen, each of said digitizers further comprising a light source disposed on one side of said grating pattern, and a pair of adjacent photodiodes disposed to view said light source through said grating pattern, said photodiodes producing output pulses in opposing phase relationships for the oppositely directed motion of said grating pattern therebefore.

9. A scanning-measuring projector as described in claim 7 wherein said scanning table housing comprises a box enclosure having a large rectangular opening provided in the upper surface thereof, and said scanning screen and associated mechanism comprises a first pair of spaced apart parallel rails disposed across said rectangular opening and adapted to slide along said opening, a first flexible curtain which forms a portion of said scanning screen slidably disposed in band-like fashion around the inner surface of said housing and affixed at the ends thereof to the outer edges of said first pair of parallel rails whereby translation of said rails in said opening slides said first curtain longitudinally in the plane of said opening, a second pair of spaced parallel rails, shorter than said first pair of rails and slidably disposed orthogonally therebetween, a second flexible curtain which is smaller than said first curtain and which forms a further portion of said scanning screen slidably disposed in band-like fashion around the inner surface of said housing and affixed at the ends thereof to the outer edges of said second pair of parallel rails whereby the translation of said second rails within said first rails slides said second curtain laterally in the plane of said rectangular opening, and a small rigid plate provided with said scanning aperture therein adapted to fit the rectangular space between said first curtain and said second curtain and to form the remainder of said scanning screen, said plate being attached to said second pair of parallel rails to be movable therewith whereby said scanning aperture in said plate may be selectively guided along a curve projected on said scanning screen.

10. Apparatus as described in claim 7 and further characterized by a gating circuit coupled between the output of said pulse center finder and the gating inputs of said four counting circuits, said gating circuit having a first gating input coupled to an output of said first counting circuit and receiving signals therefrom indicative of motion of said screen in said first reference direction, said gating circuit having a second gating input coupled to an output of said second counting circuit and receiving signals therefrom indicative of motion of said screen in said second reference direction, said gating circuit having a third gating input coupled in common to separate outputs of said third and fourth counting circuits and receiving signals therefrom indicative of each completed revolution of said drum, whereby said gating circuit transmits signals from said pulse center finder at the output thereof only throughout a single revolution of said drum at any stationary position thereof with respect to said screen.

11. Apparatus as described in claim 7 wherein each of said counting circuits is characterized by a reversible scaler having an input coupled to the respective one of said positioning digitizers, said reversible scalers being of the type which add input counts thereto for the digitized motion in an assumed positive direction and which subtract input counts thereto for the digitized motion in an assumed negative direction, a read-out register, and comprising the further combination of a first gate coupled between each of said reversible scalers and each of said read-out registers, said first gates receiving a gate input from said pulse center finder and transferring the instantaneous counts from said scalers to said registers upon the occurrence of such gate signal therefrom, a second gate coupled to the separate outputs of each of said read-out registers, and an actuator switch disposed near said scanning screen to be selectively operated, said switch being coupled to a gating input of each second gate whereby the scanning position data in said read-out registers is available only during the operation of said actuator switch.

No references cited.

MALCOLM A. MORRISON, *Primary Examiner.*

MARTIN P. HARTMAN, *Assistant Examiner.*